3,337,612
PROCESS FOR TREATING ACTIVATED CARBON TO BE USED IN THE PURIFICATION OF NYLON SALT SOLUTION
David Lee Sharps, Martinsville, Va., assignor to E. I. du Pont de Nemours and Company, a corporation of Delaware
No Drawing. Filed Mar. 26, 1964, Ser. No. 355,086
8 Claims. (Cl. 260—501)

This invention relates to a process for purification of nylon salt solutions to be used in the production of polyamides, and more particularly, to a process for treating the activated carbon to be used in the purification of nylon salt solution.

In the production of synthetic linear polyamides from diamines and dibasic acids, the first step is the combination, in aqueous solution, of approximately equimolar amounts of the diamine and the dibasic acid to form the corresponding salt. The salt solution is usually purified to remove traces of organic impurities by contacting activated carbon with the solution. The solution is then evaporated to the desired concentration and subjected to heat and pressure to form a polymer of the desired molecular weight.

A preferred method of purifying the salt solution is to pass it continuously through a fixed bed or column of activated carbon. In processes of this type it is desirable that the activated carbon bed or column have a relatively long life since replenishing the carbon is expensive and interruptions in the process frequently lead to non-uniform quality in the effluent salt solution.

It is an object of this invention to provide an improved process for the purification of nylon salt solution. Another object is to provide a process for pre-treatment of fresh activated carbon whereby the life of the carbon is considerably extended when used in the purification of nylon salt solutions. Other objects will become apparent from the description and example to follow.

The above objects are accomplished in a process for purification of nylon salt solution by passing in contact with a fixed body of activated carbon, by the preliminary steps comprising purging the activated carbon, prior to use, with a substantially oxygen-free, inert gas over a period of at least one hour; displacing the gas with de-ionized water and washing the carbon by passage of de-ionized water therethrough.

The purging of the carbon may be done by passing a substantially oxygen-free, inert gas through the carbon for a period of at least one hour but preferably for four hours or more, depending somewhat upon the temperature of the gas and the rate of flow. With higher temperatures and flow rates, a shorter period of purging may be used. A minimum flow rate of about 0.05 liter per minute per liter of carbon is desirable. Since air is entrained in the pores of the fresh activated carbon bed, the gas temperature should not exceed 140° C. so as to prevent burning of the carbon. Though lower temperatures could be used, it is preferred that the gas temperature be between 15° C. and 140° C.

Preferably, the de-ionized water used to displace the gas from the carbon is hot, i.e., from about 60° C. to 100° C. It is also desirable that the carbon be given a hot de-ionized water wash by passage of hot de-ionized water through the carbon bed or column to remove water-soluble impurities. Additional washing is genaerally required to remove the fine particles from the carbon. This additional washing may be done with hot or cold de-ionized water, but for reasons of economy the latter is preferred. The hot and cold water washes may be carried out in any order. However, it is desirable in most cases that the final wash be at the same temperature as the nylon salt solution to be purified. Lower temperatures of the final wash lead to crystallization of the nylon salt in the column while higher temperatures lead to degradation of the salt. It is essential that all water used be de-ionized water to prevent contamination of the nylon salt solution.

Gases which are substantially oxygen-free such as nitrogen, helium, hydrogen, carbon dioxide or the gases formed by burning propane, butane or other gas in air may be used in the process of this invention. It is preferred that the oxygen content of the gas be less than 0.1% by volume in order to lengthen the life of the carbon to a greater extent and to increase the efficiency of the process.

In the following example, which is illustrative of methods which may be used in the practice of this invention, all percentages are percent by volume unless otherwise indicated.

EXAMPLE

Granular activated carbon (623 liters of 12 to 40 mesh carbon) from bituminous coal is placed in a tubular stainless steel container having an inside diameter of 55.9 cm. and a height of 254 cm. to form a column for removal of impurities of nylon salt solution. The carbon is supported by a 50 mesh screen at the bottom of the container. Inert gas, substantially free from oxygen, formed by the burning of propane in air, is passed at room temperature (25° C.) upwardly through the column at a rate of 56.6 liters per minute for a period of 6 hours. The gas contains about 87–88% nitrogen and 12–13% carbon dioxide with a trace of carbon monoxide and a maximum of 0.001% oxygen. The flow of gas is then discontinued and 80° C. de-ionized water is slowly introduced at the bottom of the column to displace the gas. When the column is filled with water, it is opened at the top and the carbon is stirred to remove gas pockets. The column is then closed and cold de-ionized water passed upwardly through the carbon at a rate of 7.57 liters per minute for 4 hours. De-ionized water at 80° C. is then passed downwardly through the carbon at a rate of 7.57 liters per minute for 6 hours. De-ionized water at 40° C. is then passed downwardly through the column at 7.57 liters per minute to cool the column to normal operating temperature. When the column temperature reaches 40° C., the water flow is discontinued and a 31% by weight aqueous solution of nylon salt at 40° C. prepared from approximately equimolar portions of hexamethylene diamine and sebacic acid is started flowing down through the column at a rate of 2.84 liters/min. Flow through the column is continued until 70 kg. of dry salt per kg. of carbon have passed through the column, at the end of which time the effluent salt is still of satisfactory purity for production of high molecular weight polymer for the production of nylon yarn. By comparison, when the column is put into operation without the oxygen-free gas treatment, it produces only 40 kg. of dry salt per kg. of carbon before the level of impurities, as judged by color, becomes too high.

As shown by the foregoing example, the process of this invention leads to an increase in excess of 75% in the life of activated carbon used in the purification of nylon salt solutions. This increased life provides a substantial saving in cost of operation and contributes to an over-all improvement in the uniformity of the purified salt due less interruptions in the purification process.

The present process may be used in the purification of any of the salt solutions prepared from diamines and dibasic acids for production of polyamides. Salt solutions such as those prepared from the diamines and dibasic acids disclosed in U.S. 2,013,523 may be satisfactorily purified by this process. Particularly suitable for use in this process are the salt solutions prepared by the reaction of substantially equimolar portions of a dibasic acid selected from the group consisting of sebacic acid, adipic acid, pimelic acid, suberic acid, azelaic acid, isophthalic acid, 5-tertiary-butylisophthalic acid and dodecanedioic acid with a diamine selected from the group consisting of hexamethylene diamine, para-xylylene diamine, and bis-p-aminocyclohexylmethane.

The water used in the process of this invention may be provided by distillation if desired, but is de-ionized more economically by passage through a de-ionizing column. Such columns are well-known in the art and are commercially available.

Any of the activated carbons which are commonly available, such as those from coal, wood, coconut shell, etc., are satisfactory for use in the process of this invention.

If desired, gas pressures above atmospheric may be employed in purging the carbon to facilitate penetration of the carbon by the gas. Also, removal of the gas after purging may be facilitated by reducing the pressure below atmospheric just before and during the addition of the water used to displace the gas.

An alternate procedure for treating the carbon is the repeated application of vacuum followed by purging with substantially oxygen-free gas over a period of at least one hour.

It is clear that other changes, modifications and embodiments not explicitly illustrated herein may be made in this invention without departing from the spirit or scope thereof which is accordingly intended to be limited only by the scope of the appended claims.

What is claimed is:

1. In a process for purification of nylon salt solution by passing in contact with a fixed body of activated carbon to remove organic impurities, the preliminary steps comprising purging the activated carbon, prior to use, with a substantially oxygen-free, inert gas selected from the group consisting of nitrogen, helium, hydrogen, carbon dioxide, and the gases formed by burning propane and butane in air, at a temperature of from about 15° C. to 140° C. over a period of at least one hour, displacing said gas with de-ionized water and washing the carbon by passage of deionized water therethrough.

2. The process of claim 1 wherein said purging is done over a period of at least four hours.

3. The process of claim 1 wherein said purging is done at a minimum flow rate of about 0.05 liter per minute per liter of carbon.

4. The process of claim 1 wherein the inert gas contains less than 0.1% by volume of oxygen.

5. The process of claim 1 wherein the inert gas is one formed by burning propane in air.

6. In a process for purification of nylon salt solution by passing in contact with a fixed body of activated carbon to remove organic impurities, the preliminary steps comprising purging the activated carbon, prior to use, with a substantially oxygen-free, inert gas selected from the group consisting of nitrogen, helium, hydrogen, carbon dioxide and the gases formed by burning propane and butane in air at a temperature between 15° C. and 140° C. over a period of at least one hour, displacing said gas with de-ionized water at a temperature of from about 60° C. to 100° C. and washing the carbon by passage of deionized water therethrough.

7. The process of claim 6 wherein the temperature of the final washing step is the same as the temperature of the nylon salt solution to be purified.

8. In a process for the purification of nylon salt solution by passing in contact with a fixed body of activated carbon to remove organic impurities, the preliminary steps comprising purging the activated carbon, prior to use, with an inert gas selected from the group consisting of nitrogen, helium, carbon dioxide and the gases formed by burning propane and butane in air, said inert gas having less than 0.1% by volume of oxygen and a temperature of from 15° C. to 140° C., at a minimum flow rate of about 0.05 liters per minute per liter of carbon over a period of at least one hour, displacing said gas with de-ionized water at a temperature of from about 60° C. to 100° C. and washing the carbon by passage of deionized water therethrough.

References Cited

UNITED STATES PATENTS

| 2,008,145 | 7/1935 | Morrell | 252—421 |
| 2,721,184 | 10/1955 | Voorhies | 252—445 |
| 3,252,919 | 3/1966 | Bigelow et al. | 252—421 |
| 3,256,206 | 6/1966 | Doying | 252—421 |

FOREIGN PATENTS

| 1,124,507 | 3/1962 | Germany. |

LORRAINE A. WEINBERGER, *Primary Examiner.*

MARY B. WEBSTER, *Assistant Examiner.*